(12) United States Patent
Luick

(10) Patent No.: US 8,019,968 B2  
(45) Date of Patent: Sep. 13, 2011

(54) 3-DIMENSIONAL L2/L3 CACHE ARRAY TO HIDE TRANSLATION (TLB) DELAYS

(75) Inventor: David A. Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 669 days.

(21) Appl. No.: 12/031,006

(22) Filed: Feb. 14, 2008

(65) Prior Publication Data

US 2009/0210624 A1    Aug. 20, 2009

(51) Int. Cl.  
*G06F 12/00* (2006.01)

(52) U.S. Cl. .......................... 711/207; 711/220

(58) Field of Classification Search ........................ None  
See application file for complete search history.

(56) References Cited

U.S. PATENT DOCUMENTS

| | | | |
|---|---|---|---|
| 5,668,968 A * | 9/1997 | Wu | 711/3 |
| 7,099,999 B2 * | 8/2006 | Luick | 711/137 |
| 2005/0071601 A1 * | 3/2005 | Luick | 711/206 |
| 2009/0129138 A1 * | 5/2009 | Sumita | 365/72 |
| 2009/0210625 A1 | 8/2009 | Luick | |

OTHER PUBLICATIONS

Office Action of U.S. Appl. No. 12/030,965, dated Jan. 10, 2011.

* cited by examiner

*Primary Examiner* — Brian R Peugh  
(74) *Attorney, Agent, or Firm* — Patterson & Sheridan, LLP

(57) ABSTRACT

Embodiments of the invention provide a look-aside-look-aside buffer (LLB) configured to retain a portion of the real addresses in a translation look-aside (TLB) buffer to allow prefetching of data from a cache. A subset of real address bits associated with an effective address may be retrieved relatively quickly from the LLB, thereby allowing access to the cache before the complete address translation is available and reducing cache access latency.

20 Claims, 9 Drawing Sheets

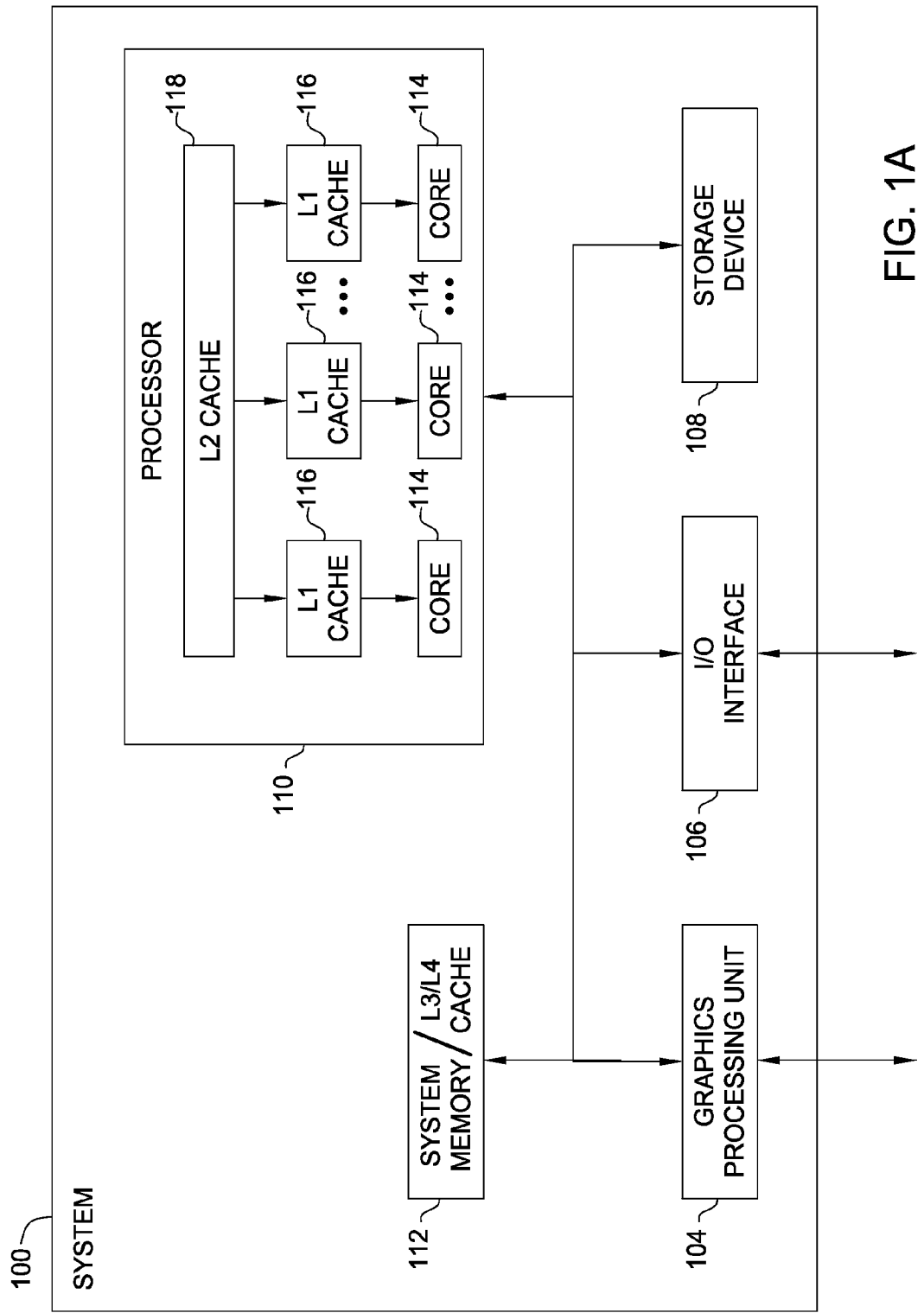

US 8,019,968 B2

3-DIMENSIONAL L2/L3 CACHE ARRAY TO HIDE TRANSLATION (TLB) DELAYS

CROSS-REFERENCE TO RELATED APPLICATIONS

This application is related to commonly-owned co-pending U.S. patent application Ser. No. 12/030,965, entitled "SELF PREFETCHING L3/L4 CACHE MECHANISM" filed on the same day as the present application, which is herein incorporated by reference.

BACKGROUND OF THE INVENTION

1. Field of the Invention

The present invention generally relates to the field of computer processors. More particularly, the present invention relates to caching mechanisms utilized by a computer processor.

2. Description of the Related Art

Modern computer systems typically contain several integrated circuits (ICs), including a processor which may be used to process information in the computer system. The data processed by a processor may include computer instructions which are executed by the processor as well as data which is manipulated by the processor using the computer instructions. The computer instructions and data are typically stored in a main memory in the computer system.

Processors typically process instructions by executing each instruction in a series of small steps. In some cases, to increase the number of instructions being processed by the processor (and therefore increase the speed of the processor), the processor may be pipelined. Pipelining refers to providing separate stages in a processor where each stage performs one or more of the small steps necessary to execute an instruction. In some cases, the pipeline (in addition to other circuitry) may be placed in a portion of the processor referred to as the processor core. Some processors may have multiple processor cores.

As an example of executing instructions in a pipeline, when a first instruction is received, a first pipeline stage may process a small part of the instruction. When the first pipeline stage has finished processing the small part of the instruction, a second pipeline stage may begin processing another small part of the first instruction while the first pipeline stage receives and begins processing a small part of a second instruction. Thus, the processor may process two or more instructions at the same time.

To provide for faster access to data and instructions as well as better utilization of the processor, the processor may have several caches. A cache is a memory which is typically smaller than the main memory and is typically manufactured on the same die (i.e., chip) as the processor. Modern processors typically have several levels of caches. The fastest cache which is located closest to the core of the processor is referred to as the Level 1 cache (L1 cache). In addition to the L1 cache, the processor typically has a second, larger cache, referred to as the Level 2 Cache (L2 cache). It is not uncommon for modern processor to have other, additional cache levels, for example, an L3 cache and an L4 cache.

To provide the processor with enough instructions to fill each stage of the processor's pipeline, the processor may retrieve instructions from the L2 cache in a group containing multiple instructions, referred to as an instruction line (I-line). The retrieved I-line may be placed in the L1 instruction cache (I-cache) where the core of the processor may access instructions in the I-line. Blocks of data to be processed by the processor may similarly be retrieved from the L2 cache and placed in the L1 cache data cache (D-cache).

The process of retrieving information from higher cache levels and placing the information in lower cache levels may be referred to as fetching, and typically requires a certain amount of time (latency). For instance, if the processor core requests information and the information is not in the L1 cache (referred to as a cache miss), the information may be fetched from the L2 cache. Each cache miss results in additional latency as the next cache/memory level is searched for the requested information. For example, if the requested information is not in the L2 cache, the processor may look for the information in an L3 cache or in main memory.

In some cases, a processor may process instructions and data faster than the instructions and data are retrieved from the caches and/or memory. For example, after an I-line has been processed, it may take time to access the next I-line to be processed (e.g., if there is a cache miss when the L1 cache is searched for the I-line containing the next instruction). While the processor is retrieving the next I-line from higher levels of cache or memory, pipeline stages may finish processing previous instructions and have no instructions left to process (referred to as a pipeline stall). When the pipeline stalls, the processor is underutilized and loses the benefit that a pipelined processor core provides.

L3 and higher caches are generally required to be relatively large in order to have sufficient storage to service a plurality of processors. For example, an L3 cache may be shared by 8 or 16 processor cores. The large size of L3 and higher caches result in much higher access latency for the higher level caches, therefore increasing the number of pipeline stall cycles.

Furthermore, to conserve chip space, L3 and higher caches are typically designed as Dynamic Random Access Memory (DRAM) devices because DRAM devices are significantly smaller than comparable Static Random Access (SRAM) devices. However, one problem with using DRAM devices is the relatively higher access time in comparison to SRAM devices. The higher access time to retrieve data from a DRAM based L3 cache after a cache miss in the L2 cache may result in a further increase in the number of pipeline stall cycles during which the processors are unable to process instructions. Therefore, overall performance and efficiency may be adversely affected.

Accordingly, there is a need for improved methods of retrieving data from an L3 cache.

SUMMARY OF THE INVENTION

One embodiment provides a method for retrieving data from an L2 cache the method generally includes receiving an effective address of memory to be accessed from a level 2 (L2) cache, transmitting the effective address to a translation look-aside buffer (TLB) to retrieve a stored real address associated with the effective address, using a first set of effective address bits as an index into a real address array to retrieve trial real address bits, using bits of the trial real address to at least initiate access the L2 cache, comparing the trial real address bits to bits in the real address retrieved from the TLB, if the trial real address bits and real address bits retrieved from the TLB match, completing the access using the trial real address, and if the trial real address bits and real address bits retrieved from the TLB do not match, completing the access using the real address retrieved from the TLB.

One embodiment provides a system generally including at least one processor core, at least one L2 cache, a real address array, a Translation Look-aside Buffer (TLB), and access circuitry. The access circuitry is generally configured to receive an effective address from the at least one processor core, retrieve trial real address bits from the real address array to initiate access to the L2 cache, retrieve a real address associated with the effective address from the TLB, compare the trial real address bits to bits in the real address retrieved from the TLB, if the trial real address bits and real address bits retrieved from the TLB match, complete the access using the trial real address, and if the trial real address bits and real address bits retrieved from the TLB do not match, complete the access using the real address retrieved from the TLB.

One embodiment provides a processor generally including at least one L2 cache, a real address array, a Translation Look-aside Buffer (TLB), and access circuitry. The access circuitry is generally configured to receive an effective address from the at least one processor core, retrieve trial real address bits from the real address array to initiate access to the L2 cache, retrieve a real address associated with the effective address from the TLB, compare the trial real address bits to bits in the real address retrieved from the TLB, if the trial real address bits and real address bits retrieved from the TLB match, complete the access using the trial real address, and if the trial real address bits and real address bits retrieved from the TLB do not match, complete the access using the real address retrieved from the TLB.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 1A-B illustrate an exemplary system according to an embodiment of the invention.

DETAILED DESCRIPTION OF THE PREFERRED EMBODIMENTS

Figure 1B:
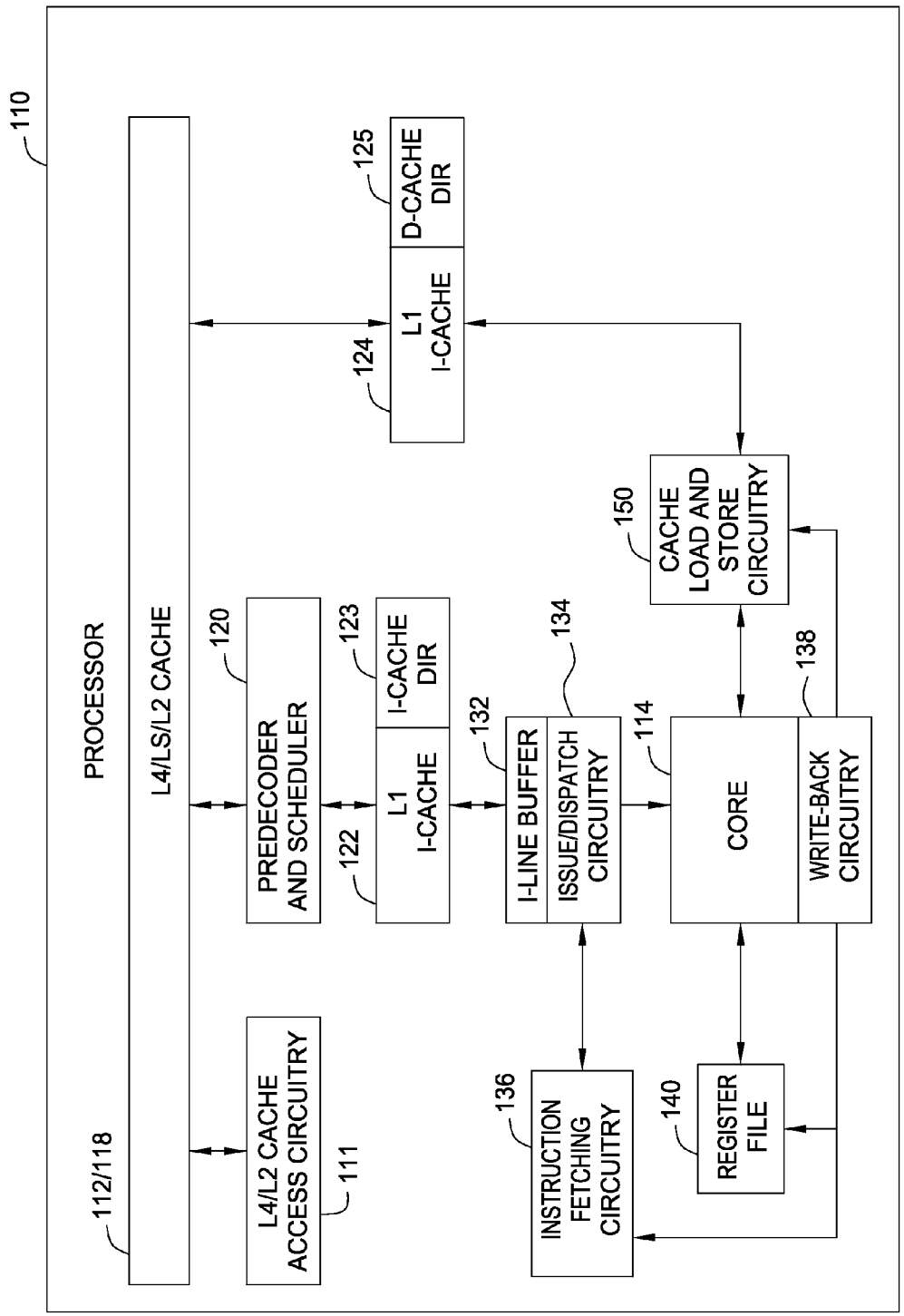

The present invention generally relates to the field of computer processors. More particularly, the present invention relates to caching mechanisms utilized by a computer processor. A look-aside-look-aside buffer (LLB) configured to retain a portion of the real addresses in a translation look-aside (TLB) buffer may be provided to allow prefetching of data from an L3 cache. A subset of real address bits associated with an effective address may be retrieved relatively quickly from the LLB, thereby allowing access to the L3 cache before the complete address translation is available and reducing L3 cache access latency. While described below with respect to accessing an L3 cache, embodiments of the invention may be used to access any cache level, e.g., L2 cache, L4 cache, L5 cache, etc.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Embodiments of the invention may be utilized with and are described below with respect to a system, e.g., a computer system. As used herein, a system may include any system utilizing a processor and a cache memory, including a personal computer, internet appliance, digital media appliance, portable digital assistant (PDA), portable music/video player and video game console. While cache memories may be located on the same die as the processor which utilizes the cache memory, in some cases, the processor and cache memories may be located on different dies (e.g., separate chips within separate modules or separate chips within a single module).

Exemplary System

FIG. 1A illustrates an exemplary system 100 according to an embodiment of the invention. As illustrated system 100 includes a processor 110, L3 cache/L4 cache/memory 102, graphics processing unit (GPU) 104, input/output (IO) interface 106, and a storage device 108. The memory 102 is preferably a random access memory sufficiently large to hold the necessary programming and data structures operated on by processor 110. While memory 102 is shown as a single entity, it should be understood that memory 112 may in fact comprise a plurality of modules, and that memory 112 may exist at multiple levels, for example, L3 cache, L4 cache, and main memory.

Storage device 108 is preferably a Direct Access Storage Device (DASD). Although it is shown as a single unit, it could be a combination of fixed and/or removable storage devices, such as fixed disc drives, floppy disc drives, tape drives, removable memory cards or optical storage. The memory 102 and storage 116 could be part of one virtual address space spanning multiple primary and secondary storage devices.

IO interface 106 may provide an interface between the processor and an input/output device. Exemplary input devices include, for example, keyboards, keypads, light-pens, touch-screens, track-balls, or speech recognition units, audio/video players, and the like. An output device can be any device to give output to the user, e.g., any conventional display screen.

Graphics processing unit (GPU) 106 may be configured to receive graphics data, for example, 2-Dimensional and 3-Dimensional graphics data, from a processor 110. GPU 106 may perform one or more computations to manipulate the graphics data, and render images on a display screen.

Processor 110 may include a plurality of processor cores 114. Processors cores 114 may be configured to perform pipelined execution of instructions retrieved from memory 102. Each processor core 114 may have an associated L1 cache 116. Each L1 cache 116 may be a relatively small memory cache located closest to an associated processor core 114 and may be configured to give the associated processor 114 fast access to instructions and data (collectively referred to henceforth as data).

Processor 110 may also include at least one L2 cache 118. An L2 cache 118 may be relatively larger than a L1 cache 114. Each L2 cache 118 may be associated with one or more L1 caches, and may be configured to provide data to the associated one or more L1 caches. For example a processor core 114 may request data that is not contained in its associated L1 cache. Consequently, data requested by the processor core 114 may be retrieved from an L2 cache 118 and stored in the L1 cache 116 associated with the processor core 114. In one embodiment of the invention, L1 cache 116, and L2 cache 118 may be SRAM based devices. However, one skilled in the art will recognize that L1 cache 116 and L2 cache 118 may be any other type of memory, for example, DRAM.

If a cache miss occurs in an L2 cache 118, data requested by a processor core 110 may be retrieved from an L3 cache 102. L3 cache 112 may be relatively larger than the L1 cache 116 and the L2 cache 118. Therefore, in one embodiment of the invention, to conserve chip space, the L3 cache 112 may be a DRAM based device. While a single L3 cache 112 is shown in FIG. 1A, one skilled in the art will recognize that a plurality of L3 caches 112 may also be implemented. Each L3 cache 112 may be associated a plurality of L2 caches 118, and may be configured to exchange data with the associated L2 caches 118. One skilled in the art will also recognize that one or more higher levels of cache, for example, L4 cache may also be included in system 100. Each higher level cache may be associated with one or more caches of the next lower level.

FIG. 1B is a block diagram depicting a detailed view of processor 110 according to one embodiment of the invention. For simplicity, FIG. 1B depicts and is described with respect to a single core 114 of the processor 110. In one embodiment, each core 114 may be identical (e.g., containing identical pipelines with the same arrangement of pipeline stages). For other embodiments, cores 114 may be different (e.g., containing different pipelines with different arrangements of pipeline stages).

In one embodiment of the invention, the L2 cache 118 may contain a portion of the instructions and data being used by the processor 110. In some cases, the processor 110 may request instructions and data which are not contained in the L2 cache 118. Where requested instructions and data are not contained in the L2 cache 118, the requested instructions and data may be retrieved either from a higher level cache, for example, an L3 cache or an L4 cache or system memory 112 and placed in the L2 cache 118. When the processor core 114 requests instructions from the L2 cache 118, the instructions may be first processed by a predecoder and scheduler 120.

In one embodiment of the invention, instructions may be fetched from the L2 cache 118 in groups, referred to as I-lines. Similarly, data may be fetched from the L2 cache 118 in groups referred to as D-lines. The L1 cache 116 depicted in FIG. 1A may be divided into two parts, an L1 instruction cache 122 (I-cache 122) for storing I-lines as well as an L1 data cache 124 (D-cache 124) for storing D-lines. I-lines and D-lines may be fetched from the L2 cache 118 using L2 access circuitry 111.

In one embodiment of the invention, I-lines retrieved from the L2 cache 118 may be processed by a predecoder and scheduler 120 and the I-lines may be placed in the I-cache 122. To further improve processor performance, instructions are often predecoded, for example, I-lines are retrieved from L2 (or higher) cache 118. Such predecoding may include various functions, such as address generation, branch prediction, and scheduling (determining an order in which the instructions should be issued), which is captured as dispatch information (a set of flags) that control instruction execution. For some embodiments, the predecoder (and scheduler) 120 may be shared among multiple cores 114 and L1 caches 116.

In addition to receiving instructions from the issue and dispatch circuitry 134, the core 114 may receive data from a variety of locations. Where the core 114 requires data from a data register, a register file 140 may be used to obtain data. Where the core 114 requires data from a memory location, cache load and store circuitry 150 may be used to load data from the D-cache 124. Where such a load is performed, a request for the required data may be issued to the D-cache 124. At the same time, the D-cache directory 125 may be checked to determine whether the desired data is located in the D-cache 124. Where the D-cache 124 contains the desired data, the D-cache directory 125 may indicate that the D-cache 124 contains the desired data and the D-cache access may be completed at some time afterwards. Where the D-cache 124 does not contain the desired data, the D-cache directory 125 may indicate that the D-cache 124 does not contain the desired data. Because the D-cache directory 125 may be accessed more quickly than the D-cache 124, a request for the desired data may be issued to the L2 cache 118 (e.g., using the L2 access circuitry 210) after the D-cache directory 125 is accessed but before the D-cache access is completed.

In some cases, data may be modified in the core 114. Modified data may be written to the register file, or stored in memory. Write back circuitry 138 may be used to write data back to the register file 140. In some cases, the write back circuitry 138 may utilize the cache load and store circuitry 150 to write data back to the D-cache 124. Optionally, the core 114 may access the cache load and store circuitry 150 directly to perform stores. In some cases, as described below, the write-back circuitry 138 may also be used to write instructions back to the I-cache 122.

As described above, the issue and dispatch circuitry 134 may be used to form instruction groups and issue the formed instruction groups to the core 114. The issue and dispatch circuitry 134 may also include circuitry to rotate and merge instructions in the I-line and thereby form an appropriate instruction group. Formation of issue groups may take into account several considerations, such as dependencies between the instructions in an issue group as well as optimizations which may be achieved from the ordering of instructions as described in greater detail below. Once an issue group is formed, the issue group may be dispatched in parallel to the processor core 114. In some cases, an instruction group may contain one instruction for each pipeline in the core 114. Optionally, the instruction group may a smaller number of instructions.

Self Prefetching L3 Cache

As discussed earlier, if data or instructions are not found in a first cache level, a higher cache level may be accessed. For example, L3 cache access circuitry 111 may initiate access to an L3 cache to transfer data to an associated L2 cache. Embodiments of the invention provide methods and systems to prefetch desired data from a higher cache level to reduce cache access latency. For example data may be prefetched from an L3 cache 112 and transferred to an L2 cache 118. One skilled in the art will recognize that prefetching, according to embodiments of the invention, may be performed at any cache level, for example, L2 cache, L3 cache, L4 cache, L5 cache, and the like. Accordingly, cache access circuitry 111 (collectively representing L2, L3, and L4 cache access circuitry in FIG. 1B) is provided to prefetch data from an associated cache, for example, an L2 cache 118, L3 cache 112, or an L4 cache.

An L3 cache 112 may be configured to service a plurality of processor cores 114, illustrated in FIG. 1A. For example, in some embodiment, an L3 cache 112 may service between 8 and 16 processor cores 114. Accordingly, the L3 cache 112 may be sufficiently large to retain instructions and data that are likely to be accessed by the associated plurality of processor cores 114. Because of the large size of the L3 cache 112, accessing data in the L3 cache 112 may take much longer than accessing L1 and L2 caches. Furthermore, L3 caches 112 are typically designed as much slower DRAM devices, which further adds to the access latency. Embodiments of the invention provide for prefetching of data from an L3 cache 112 to reduce L3 cache access latency, thereby improving performance.

Figure 2:
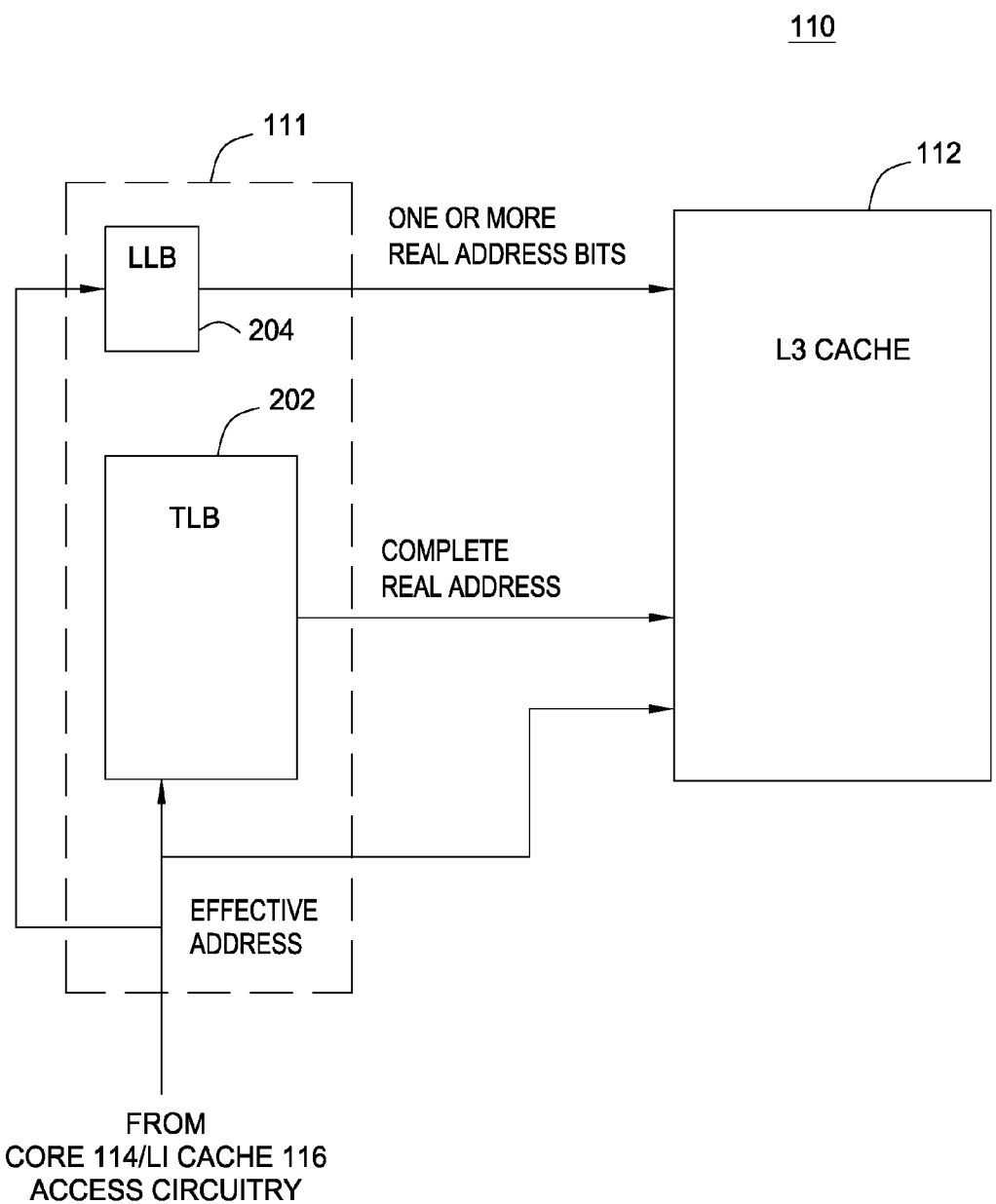
FIG. 2 illustrates cache access circuitry for an exemplary processor according to an embodiment of the invention.

FIG. 2 illustrates a detailed view of components of L3 cache access circuitry 111 for facilitating L3 cache prefetching, according to an embodiment of the invention. As illustrated in FIG. 2, L3 cache access circuitry 111 may include an L3 cache 112, a translation look-aside buffer (TLB) 202, and a look-aside-look-aside buffer (LLB) 204.

TLB 202 may be configured to translate an effective address to a real address. An effective address may be an address generated by a processor 114 configured to reference a memory location in system 100. A real address may be an address of a block of memory in memory 112. In some embodiments, memory 112 may act as a 'cache' for storage device 108. Accordingly, memory 112 may contain active portions of programs stored in storage 108 that are being executed by one or processor cores 114. Because the processor cores generate effective addresses, the effective address may be translated to a real address before accessing memory 112.

Translating an effective address into a real address may involve referring to a page table. A page table may be indexed with page numbers associated with each effective address and may contain a corresponding page number for a physical address. The page table may be stored in memory 112, or storage device 108. TLB 202 may obviate the relatively large latency to access a page table in memory 112 by providing fast address translations. For example, TLB 202 may act as an address translation cache by storing a portion of the page table and retain address translations for recently used effective addresses by the processor cores 114. In one embodiment of the invention, TLB 202 may be a DRAM device or an SRAM device. In a particular embodiment, TLB 202 may be a 32 way set associative device configured to store 64K entries.

Even with the relatively faster address translation provided by TLB 202, address translation and retrieval of data from an L3 cache 112 may be too slow relative to the speed of processors 114. For example, a DRAM TLB device 202 may require anywhere from 10 to 30 clock cycles to retrieve an address translation. Moreover, once the address translation is retrieved, accessing an L3 cache 112 may add to the latency in retrieving data. As described above, because an L3 caches 112 may be relatively large DRAM devices, retrieving data from the L3 cache 112 may be too slow, thereby resulting in undesired stall cycles in the processor core pipelines.

In one embodiment of the invention, LLB 204 may be provided to quickly retrieve a partial translation of the effective address, with which, access to the L3 cache 112 may be initiated before the complete address translation is retrieved from TLB 202. For example, LLB 204 may provide one or more real address bits that make it possible to initiate access to L3 cache 112, as illustrated in FIG. 2. By initiating an L3 cache access before the complete address translation is available, L3 cache access latency may be significantly reduced.

In one embodiment of the invention, LLB 204 may be an SRAM device. Alternatively, LLB 204 may be a DRAM device. In a particular embodiment of the invention, LLB 204 may be an 8K direct mapped device configured to store 10 bit entries. One skilled in the art will recognize that the relatively small size of the SRAM based LLB 204 may allow a relatively fast retrieval of data from LLB 204. For example, in one embodiment, data may be retrieved from LLB 204 in 3 clock cycles.

LLB 204 may use a portion of an effective address as an index to retrieve one or more bits of the real address. Any combination of one or more bits of the real address retrieved from LLB 204 and one or more bits of the effective address may be used to initiate access to L3 cache 112, as illustrated in FIG. 2. For example, one or more bits of the effective address may be used to initiate a row access to L3 cache 112. The one or more bits of the real address retrieved from the LLB may be used to initiate a first column access of L3 cache 112.

In one embodiment of the invention, retrieval of the complete real address from TLB 202 may be completed at or before the time completion of L3 cache access. The complete address retrieved from TLB 202 may be used to select the particular data to be retrieved from L3 cache 112. For example, the complete real address retrieved from TLB may be used for set selection, which may complete the L3 cache access.

For example, a first set of effective address bits may be used to assert a Row Access Strobe (RAS) signal. A second set of effective address bits may be used as an index to retrieve a first set of real address bits from LLB 204. The first set of real address bits may be used to assert a Column Access Strobe (CAS) signal. A second set of real address bits may be recovered from TLB 202 and used to perform a way-select to complete access to L3 cache 112.

Figure 3:
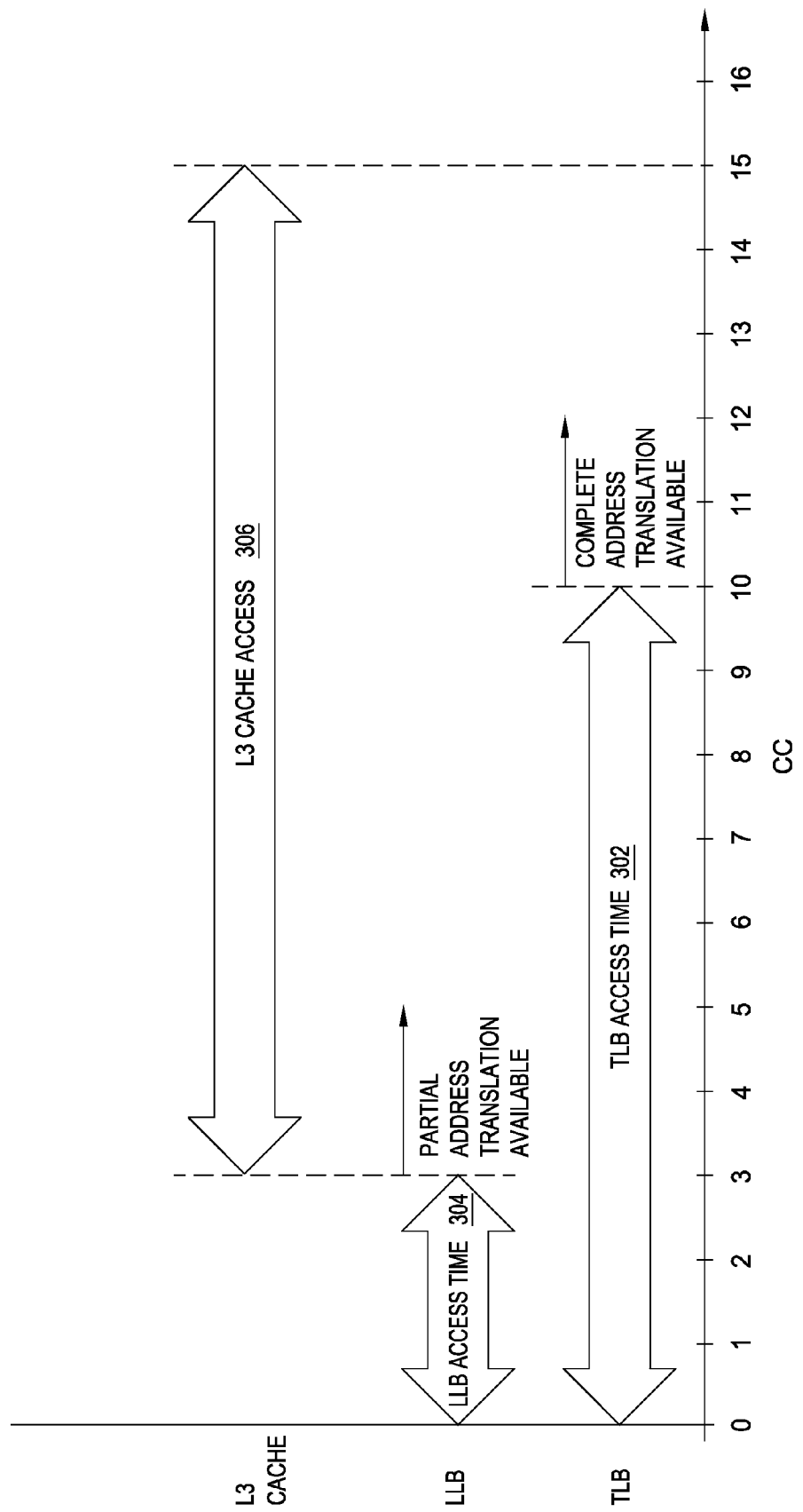
FIG. 3 illustrates an exemplary timing diagram of L3 cache prefetching, according to an embodiment of the invention.

FIG. 3 is an exemplary timing diagram illustrating L3 cache prefetching according to an embodiment of the invention. As illustrated in FIG. 3, at clock cycle (CC) 0, an effective address may be generated for retrieving data from an L3 cache 112. The effective address may be generated by a processor 114 or as a result of any another prefetching operation configured to populate a cache in a system 100 with data that is likely to be used by a processor core 114.

For example, an L1 cache 116 may contain an instruction referencing data located in a storage device 108. In response to detecting the instruction referencing the data, an effective address of the data may be generated to load the data into a cache, for example, the L1 cache 116, to make the data available to the processor core 114 at the time of execution of the instruction. Loading the data into the L1 cache 116 may involve transferring the data from the L3 cache 112 to an L2 cache 118.

An effective address may be transmitted to a TLB 202 for address translation. TLB 202 may be a DRAM based cache that has an access time of 10 clock cycles. Accordingly, the TLB access time 302 spans from CC0 to CC10 in FIG. 3. At the end of CC10, the complete address translation of the effective address may be available.

As discussed above, LLB 204 may be an SRAM based cache that has an access time of 3 clock cycles. In one embodiment of the invention, LLB 204 and TLB 202 may be accessed at or near the same time. Accordingly, LLB access time 304 begins in CC0 and end in CC3. At the end of CC3, a partial translation of the effective address may be available. In other words, one or more of the real address bits may be available after the access to LLB 204 is complete.

In prior art systems, L3 cache access begins only after the complete address translation from the TLB is available. For example, L3 cache access would begin after CC10 in FIG. 3. Embodiments of the invention allow L3 cache access to begin before complete address translation is available from TLB 202. For example, the partial address translation available from LLB 204 at the end of CC3 may be used to initiate L3 cache access, thereby reducing L3 cache access latency.

In one embodiment of the invention, L3 cache 112 may be a 96 MB, 24-way set associative cache comprising 512 byte lines with 128 byte sectors. In a particular embodiment, accessing L3 cache 112 may require 12 clock cycles. Accordingly, L3 cache access 306 begins in CC3 and ends in CC15 in FIG. 3. One skilled in the art will recognize that the particular implementation of L3 cache accessing disclosed in FIG. 3 is not limiting on the invention. More generally, any L3 cache accessing method involving initiation of L3 cache access based on one or more real address bits and prior to the complete address translation becoming available falls within the purview of the invention.

Figure 4A:
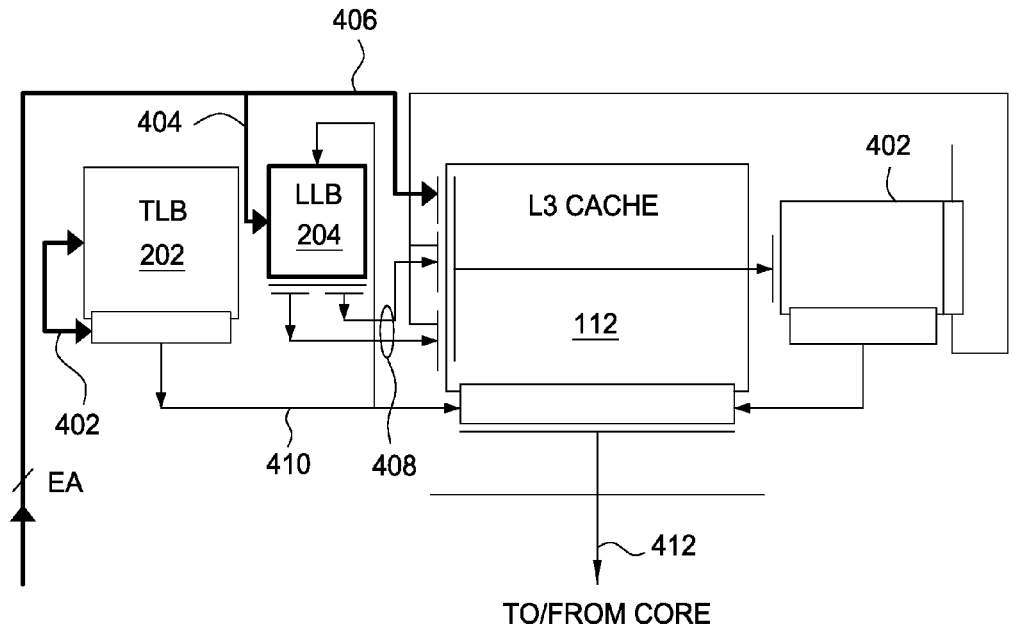
FIGS. 4A-D illustrate the transfer of effective and real address bits to facilitate L3 cache prefetching, according to an embodiment of the invention.

FIGS. 4A-D illustrate an exemplary transfer of effective address bits and real address bits between processor 110 components illustrated in FIG. 2 according to the timing diagram illustrated in FIG. 3. As illustrated in FIG. 4A, the effective address may be transmitted to TLB 202, LLB 204, and L3 cache 112 in CC0. The complete effective address 402 may be provided to TLB 202 for address translation.

In some embodiments, only a portion of the effective address 404 may be transmitted to LLB 204. For example, in a particular embodiment, 12 bits of the real address may be transmitted to LLB 204. The portion of the effective address 404 may be used as an index in LLB 204 to determine a set of one or more real address bits.

As illustrated in FIG. 4A, a portion of the effective address bits 406 may also be provided directly to L3 cache 112 in CC0. For example, in a particular embodiment, 5 effective address bits may be provided to L3 cache 112. The portion of the effective address bits 406 may directly correspond to a portion of the real address bits and may be used, for example, to select a row in the L3 cache 112.

Figure 4B:
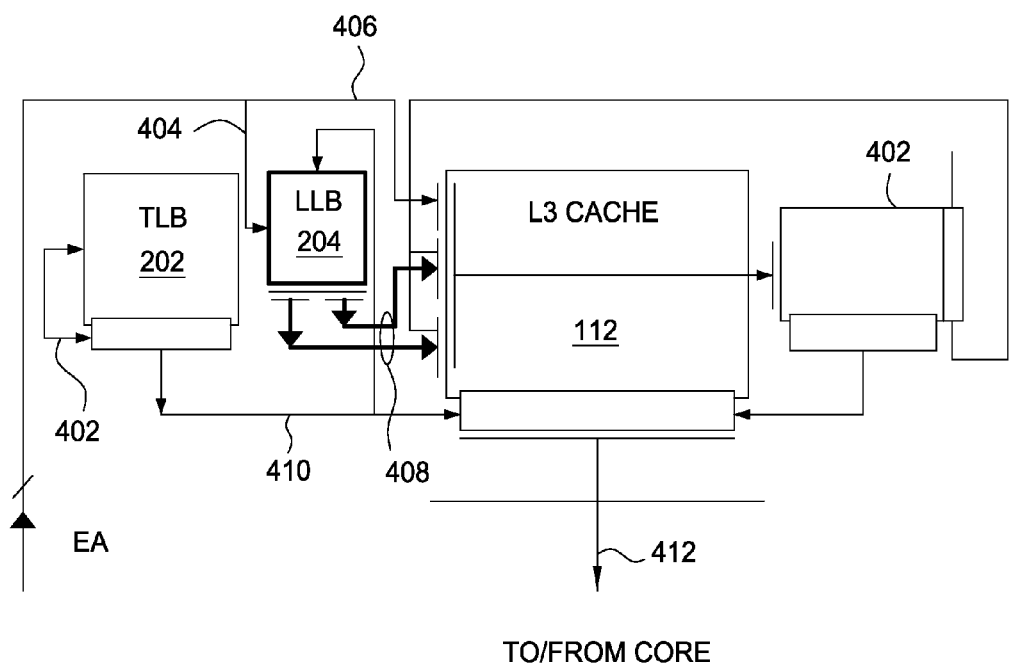

FIG. 4B illustrates the transfer of real address bits 408 from LLB 204 to L3 cache 112, associated with CC3 of FIG. 3. Real address bits 408 may be a subset of the bits comprising the real address. A sufficient number of real address bits 408 may be retrieved from LLB 204 to continue access to L3 cache 112. For example, in a particular embodiment, 10 bits of the real address may be retrieved from LLB 204 to assert a CAS signal. The 10 bits of the real address retrieved from LLB 204 along with the 12 bits of the effective address used to index LLB 204 may provide 22 total bits, which may be sufficient to access L3 cache 112. In one embodiment of the invention, real address bits 408 may allow initiating access to at least a first column in L3 cache 112.

Figure 4C:
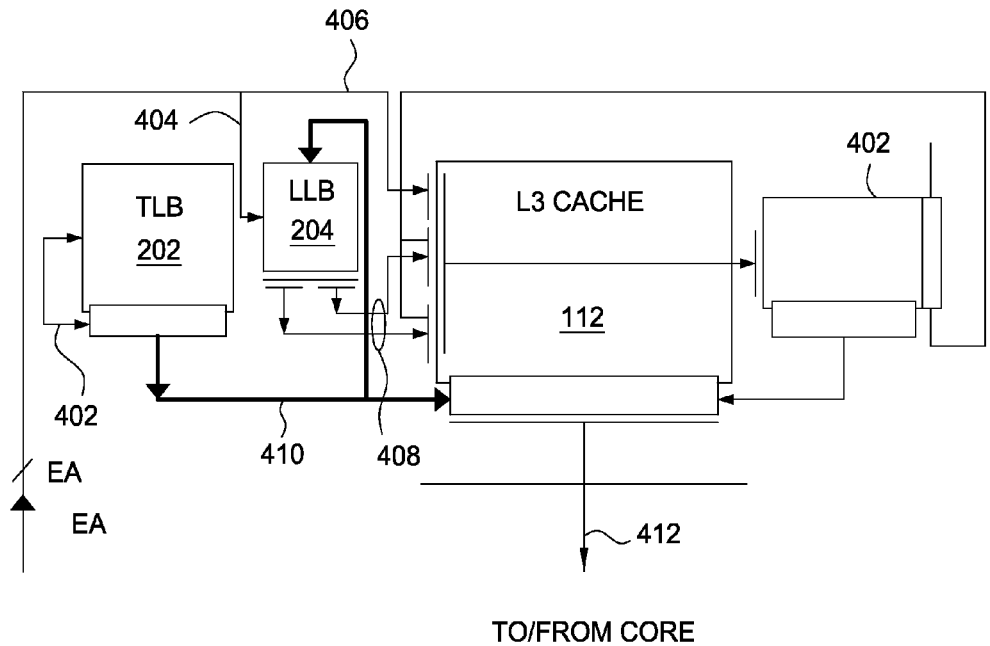

FIG. 4C illustrates the transfer of the complete real address bits 410 from TLB 202 to L3 cache 112, associated with CC10 of FIG. 3. In one embodiment of the invention, the real address bits 410 may be a subset of the complete real address. Specifically, the real address bits 410 may include those bits of the real address that were not included in real address bits 408 derived from LLB 204. The real address bits 410 may allow a final selection of data to complete the L3 cache access. For example, address bits 406 may select a row in L3 cache 112, address bits 408 may select one or more columns in L3 cache 112, and address bits 410 may select a set from which data is to be accessed in L3 cache 112.

Figure 4D:
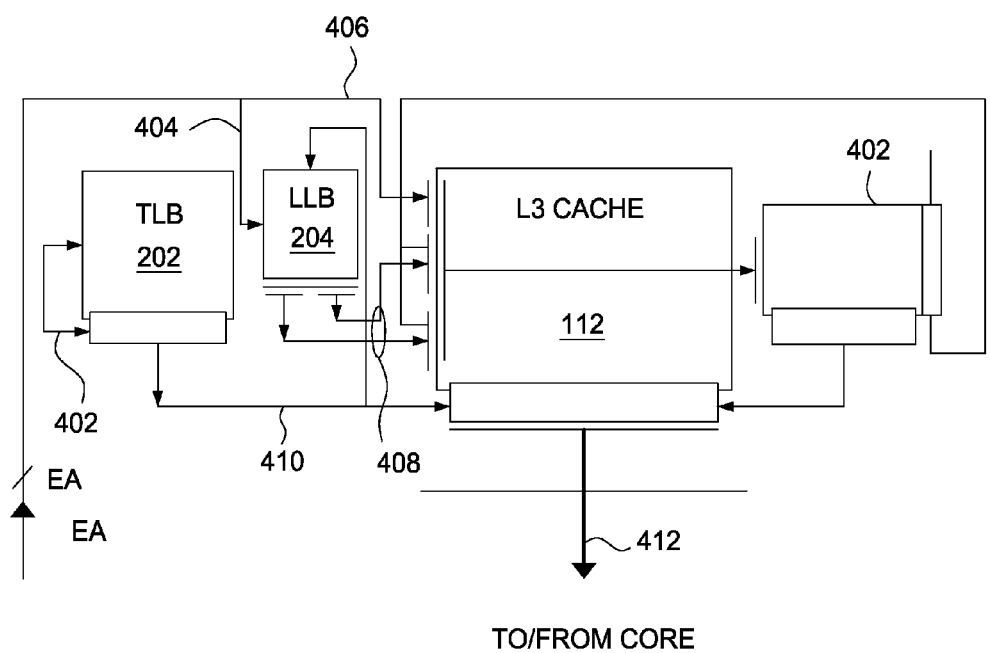

FIG. 4D illustrates the completion of access to L3 cache 112 corresponding to CC15 in FIG. 3. At the end of CC15, data 412 may be retrieved from the L3 cache 112, as illustrated in FIG. 4D. The data retrieved 412 may be sent to a higher level cache, for example, to an L2 cache 118.

Figure 5:
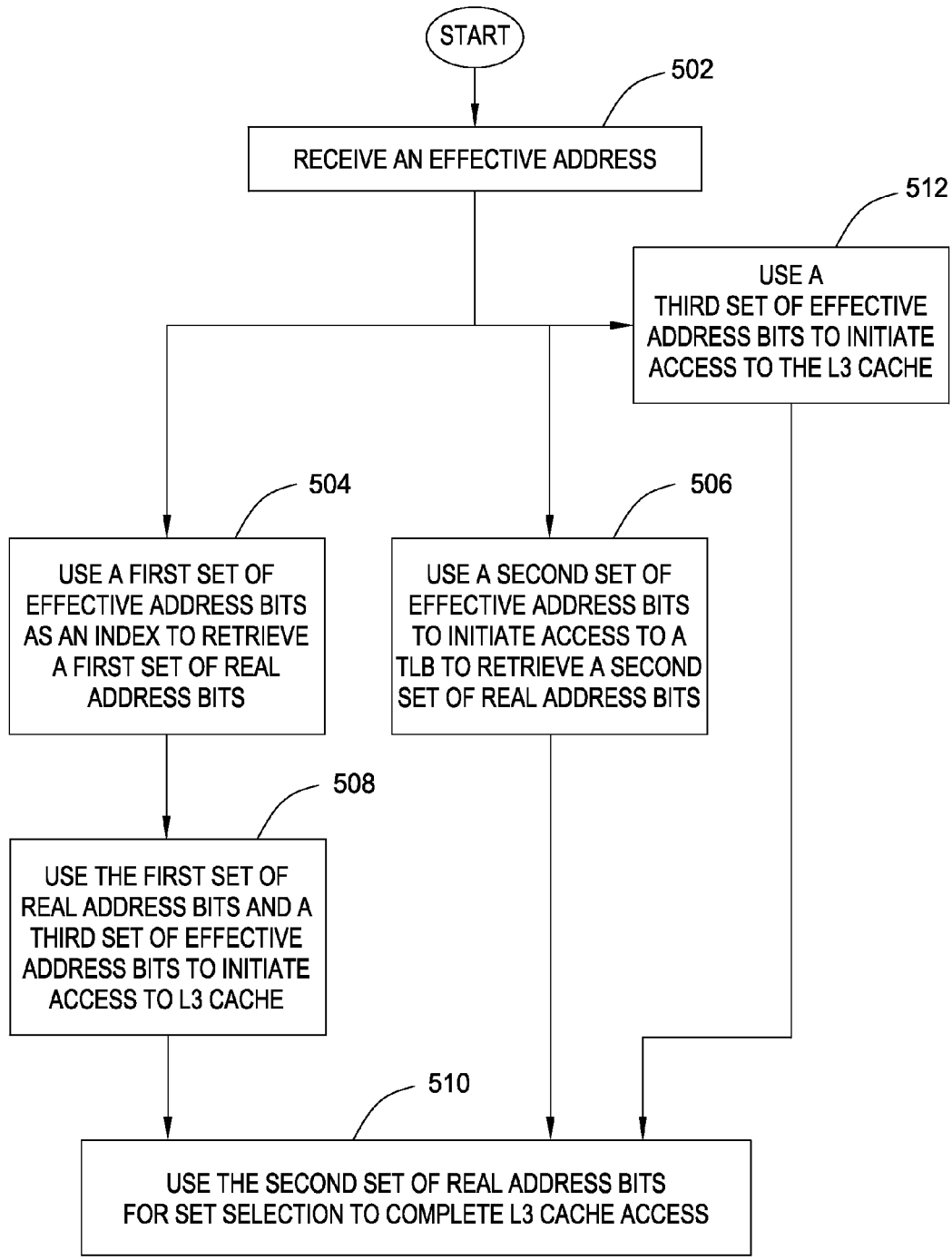
FIG. 5 is a flow diagram of exemplary operations performed during L3 cache prefetching, according to an embodiment of the invention.

FIG. 5 is a flow diagram of exemplary operation performed by a processor 110 to prefetch data from an L3 cache. The operations may begin in step 502 by receiving an effective address. For example, the effective address may be generated by a processor core 114. In step 504, a first set of bits of the effective address may be used as an index to retrieve a first set of real address bits. The first set of effective address bits may correspond to effective address bits 404 in FIG. 4D.

In step 506, a second set of effective address bits may be used to initiate access to a TLB 202 to retrieve a second set of real address bits. The second set of effective address bits may correspond to effective address bits 402 and the second set of real address bits may correspond to real address bits 410, as illustrated in FIG. 4D. In step 512, a third set of effective address bits may be used to initiate access to the L3 cache 112, for example, to initiate a row access. The third set of effective address bits may correspond with address bits 406 in FIG. 4D.

In step 508, the first set of real address bits and a third set of effective address bits may be used to initiate access to L3 cache 112. The third set of effective address bits may correspond to the effective address bits 406 shown in FIG. 4D. In step 510, the second set of real address bits may be used for set selection to complete access to L3 cache 112.

While prefetching from an L3 cache is disclosed herein for purposes of simplicity, one skilled in the art will recognize that embodiments of the invention may be implemented at any cache level, for example, in an L2, L4 or L5 cache. Furthermore, embodiments of the invention may also be implemented with any type of memory, whether located on or off chip, for example, L1 cache, main memory, and the like.

3-Dimensional L2/L3 Cache

Figure 6:
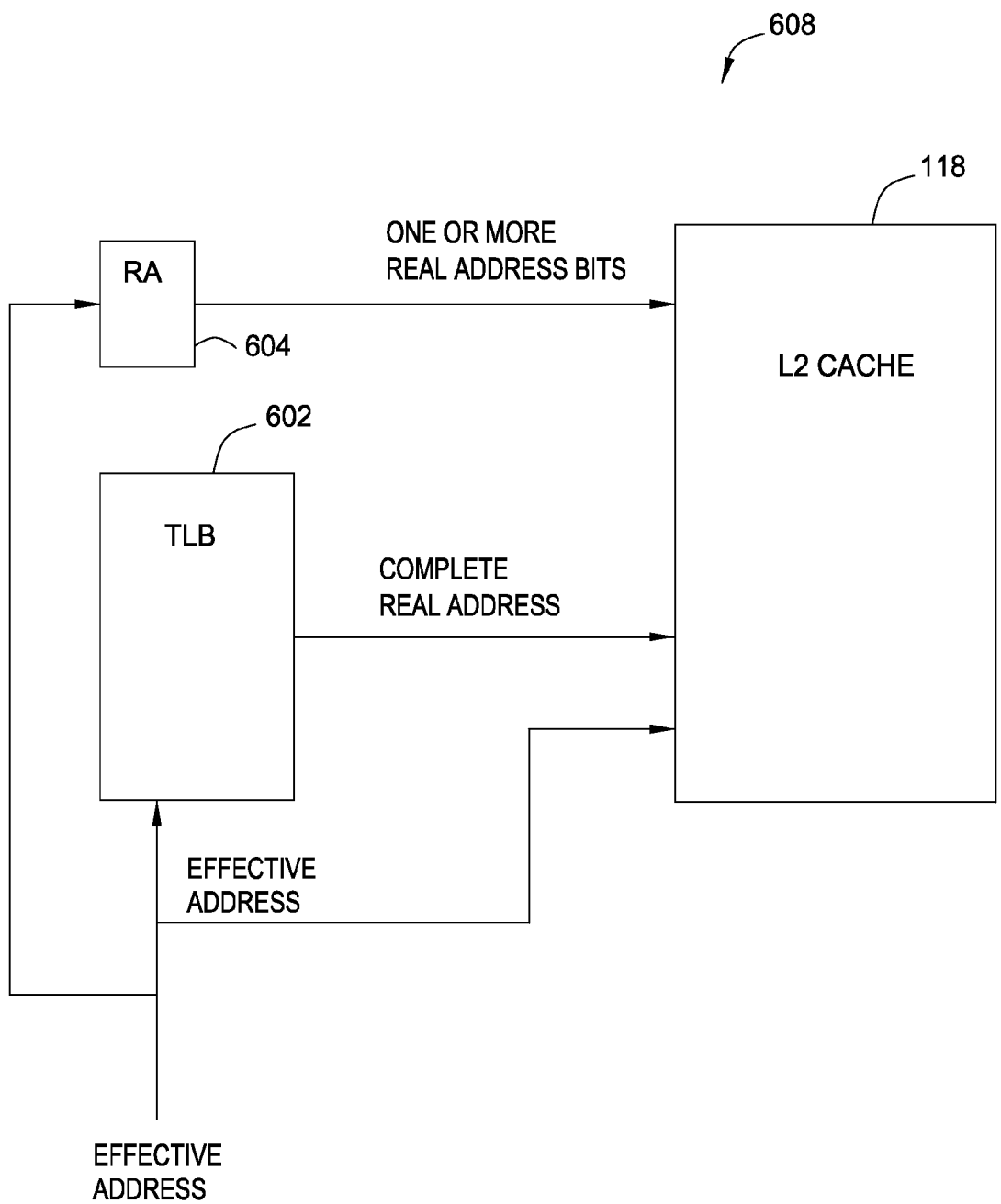
FIG. 6 illustrates cache access circuitry for an exemplary processor according to an embodiment of the invention.

FIG. 6 illustrates a detailed view of components of 3-dimensional, L2 cache access circuitry 608 according to an embodiment of the invention. Due to the difference in size between an L3 cache and an L2 cache, one implementation of accessing a 3-dimensional, L2 cache does not utilize an LLB, but instead implements a Real Address (RA) array. The smaller size of the RA array may permit look up of the real address more quickly than with an LLB. Further, due to the smaller size of an L2 cache, when compared to an L3 cache, a complete real address guess may be formed with a set of RA bits retrieved from the RA array when combined with a set of EA bits.

Where in previously mentioned embodiments the TLB may have provided necessary bits for a complete real address, in the embodiment illustrated in FIG. 6 the TLB provides a complete real address that is used to compare against the complete real address guess produced from the set of retrieved RA bits and a set of EA bits. If the two real addresses match, then the information retrieved from the 3-dimensional, L2 cache based on the complete real address guess is correct and is used, and a gain in speed is produced. In contrast, if the two real addresses do not match, then the TLB translated real address is used, however, there is no loss in time when compared to conventional methods of access.

As illustrated in FIG. 6, 3-dimensional, L2 cache access circuitry 608 may include a 3-dimensional, L2 cache 118, a translation look-aside buffer (TLB) 602, and a real address (RA) array 604.

TLB 602 may be configured to translate an effective address to a real address. An effective address may be an address generated by a processor 114 configured to reference a memory location in system 100. A real address may be an address of a block of memory in memory 118. In some embodiments, memory 118 may act as a 'cache' for storage device 108. Accordingly, memory 118 may contain active portions of programs stored in storage 108 that are being executed by one or processor cores 114. Because the processor cores generate effective addresses, the effective address may be translated to a real address before accessing memory 118.

Translating an effective address into a real address may involve referring to a page table. A page table may be indexed with page numbers associated with each effective address and may contain a corresponding page number for a physical address. The page table may be stored in memory 118, or storage device 108. TLB 602 may obviate the relatively large latency to access a page table in memory 118 by providing fast address translations. For example, TLB 602 may act as an address translation cache by storing a portion of the page table and retain address translations for recently used effective addresses by the processor cores 114. In one embodiment of the invention, TLB 602 may be a DRAM device or an SRAM device. In a particular embodiment, TLB 602 may be a 32 way set associative device configured to store 64K entries.

Even with the relatively faster address translation provided by TLB 602, address translation and retrieval of data from a 3-dimensional, L2 cache 118 may be too slow relative to the speed of processors 114. For example, a DRAM TLB device 602 may require anywhere from 10 to 30 clock cycles to retrieve an address translation. Moreover, once the address translation is retrieved, accessing a 3-dimensional, L2 cache 118 may add to the latency in retrieving data.

In one embodiment of the invention, RA array 604 may be provided to quickly retrieve a partial translation of the effective address, with which, access to the 3-dimensional, L2 cache 118 may be initiated before the complete address translation is retrieved from TLB 602. For example, RA array 604 may provide one or more real address bits that make it possible to initiate access to L2 cache 118, as illustrated in FIG. 6. By initiating an L2 cache access before the complete address translation is available, L2 cache access latency may be significantly reduced.

In one embodiment of the invention, RA array 604 may be an SRAM device. Alternatively, RA array 604 may be a DRAM device. One skilled in the art will recognize that the relatively small size of the SRAM based RA array 604 may allow a relatively fast retrieval of data from RA array 604. For example, in one embodiment, data may be retrieved from RA array 604 in 3 clock cycles.

RA array 604 may use a portion of an effective address as an index to retrieve one or more bits of the real address. Any combination of one or more bits of the real address retrieved from RA array 604 and one or more bits of the effective address may be used to initiate access to 3-dimensional, L2 cache 118, as illustrated in FIG. 6. For example, one or more bits of the effective address may be used to initiate a row access to 3-dimensional, L2 cache 118. The one or more bits of the real address retrieved from the RA array may be used to initiate a first column access of the 3-dimensional, L2 cache 118.

For example, a first set of effective address bits may be used to assert a Row Access Strobe (RAS) signal. A second set of effective address bits may be used as an index to retrieve a first set of real address bits from RA array 604. The first set of real address bits may be used to assert a Column Access Strobe (CAS) signal. A second set of real address bits may be recovered from TLB 602 and used to perform a way-select to complete access to 3-dimensional, L2 cache 118.

One skilled in the art will also recognize that there is no loss in performance even if there is a miss in RA array 604. For example, if an RA array miss occurs a complete address translation may be retrieved from TLB 602 and used to access a memory, for example, 3-dimensional, L2 cache 118. In other words, RA array hits result in performance gain, while RA array misses result in performance limited by TLB access time. Therefore, the overall performance is enhanced by providing a low cost RA array 604.

Figure 7:
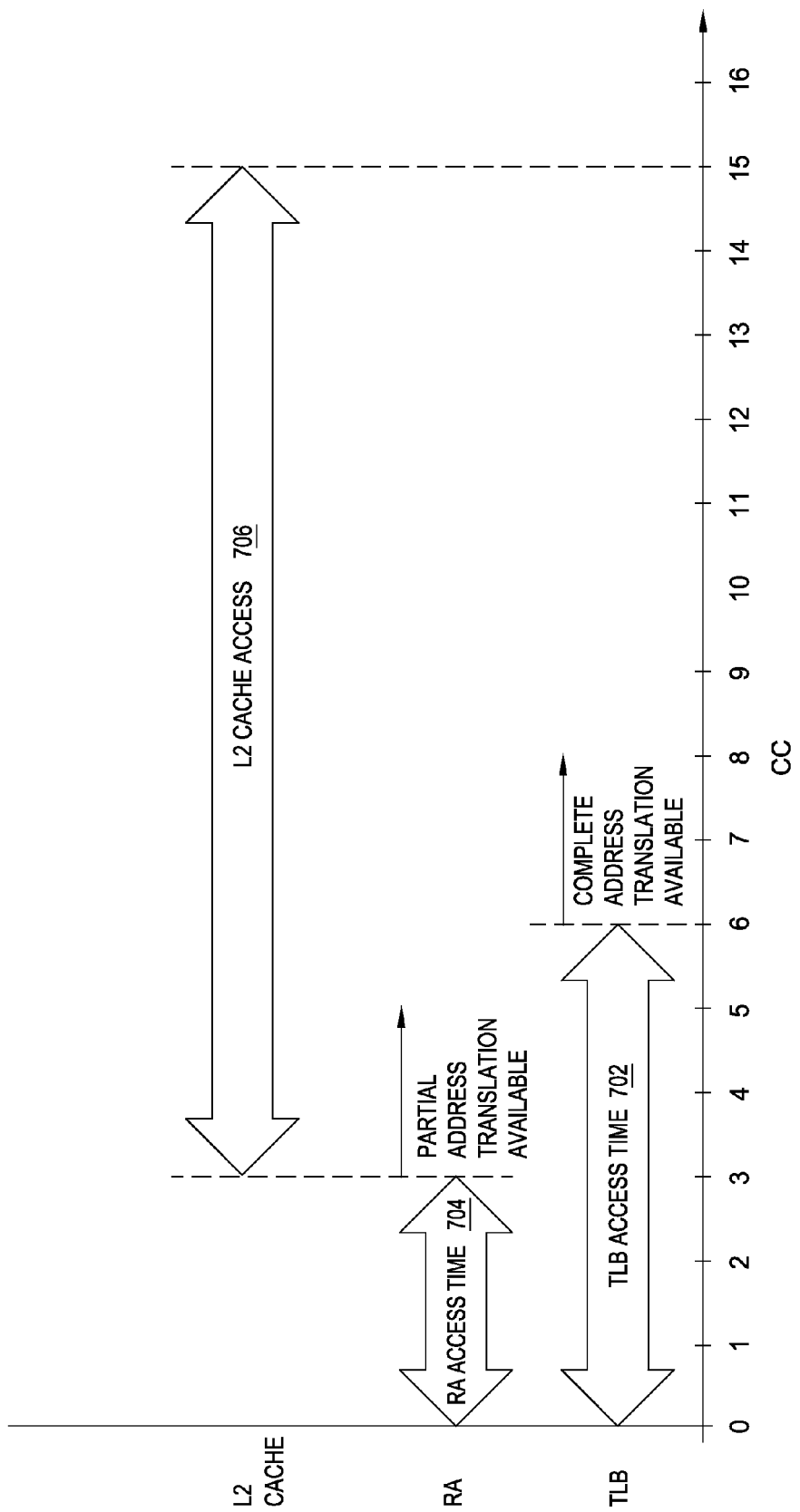
FIG. 7 illustrates an exemplary timing diagram of 3-D L2 cache access, according to an embodiment of the invention.

FIG. 7 is an exemplary timing diagram illustrating 3-dimensional, L2 cache prefetching according to an embodiment of the invention. As illustrated in FIG. 7, at clock cycle (CC) 0, an effective address may be generated for retrieving data from a 3-dimensional L2 cache 118. The effective address may be generated by a processor 114 or as a result of any another prefetching operation configured to populate a cache in a system 100 with data that is likely to be used by a processor core 114.

For example, an L1 cache 116 may contain an instruction referencing data located in a storage device 108. In response to detecting the instruction referencing the data, an effective address of the data may be generated to load the data into a cache, for example, the L1 cache 116, to make the data available to the processor core 114 at the time of execution of the instruction. Loading the data into the L1 cache 116 may involve transferring the data from the L3 cache 112 to an L2 cache 118.

An effective address may be transmitted to a TLB 602 for address translation. TLB 602 may be a DRAM based cache that has an access time of 6 clock cycles. Accordingly, the TLB access time 702 spans from CC0 to CC6 in FIG. 7. At the end of CC10, the complete address translation of the effective address may be available.

As discussed above, RA array 604 may be an SRAM based cache that has an access time of 3 clock cycles. In one embodiment of the invention, RA array 604 and TLB 602 may be accessed at or near the same time. Accordingly, RA array access time 704 begins in CC0 and end in CC3. At the end of CC3, a partial translation of the effective address may be available. In other words, one or more of the real address bits may be available after the access to RA array 604 is complete.

In prior art systems, L2 cache access begins only after the complete address translation from the TLB is available. For example, L2 cache access would begin after CC6 in FIG. 7.

Embodiments of the invention allow L2 cache access to begin before complete address translation is available from TLB 602. For example, the partial address translation available from RA array 604 at the end of CC3 may be used to initiate L2 cache access, thereby reducing L2 cache access latency.

CONCLUSION

By providing a LLB to retrieve a portion of the real address bits associated with an effective address, embodiments of the invention allow initiation of an L3 cache access before a complete translation of the effective address is completed, thereby reducing L3 cache latency.

Further, by providing a RA array to retrieve a portion of the real address bits associated with an effective address, embodiments of the invention allow initiation of a 3-dimensional, L2 cache access before a complete translation of the effective address is completed, thereby reducing 3-dimensional, L2 cache latency.

While the foregoing is directed to embodiments of the present invention, other and further embodiments of the invention may be devised without departing from the basic scope thereof, and the scope thereof is determined by the claims that follow.

What is claimed is:

1. A method for retrieving data from an L2 cache, comprising:
   receiving an effective address of memory to be accessed from a level 2 (L2) cache;
   transmitting the effective address to a translation look-aside buffer (TLB) to retrieve a stored real address associated with the effective address;
   using a first set of effective address bits as an index into a real address array to retrieve trial real address bits;
   using bits of the trial real address to at least initiate access the L2 cache;
   comparing the trial real address bits to bits in the real address retrieved from the TLB;
   if the trial real address bits and real address bits retrieved from the TLB match, completing the access using the trial real address; and
   if the trial real address bits and real address bits retrieved from the TLB do not match, completing the access using the real address retrieved from the TLB.

2. The method of claim 1, further comprising:
   if the trial real address and real address retrieved from the TLB do not match, updating the real address array with the real address retrieved from the TLB.

3. The method of claim 1, further comprising:
   if the trial real address and real address retrieved from the TLB do not match, discarding results obtained using the trial real address.

4. The method of claim 1, wherein the trial real address comprises a complete real address.

5. The method of claim 1, wherein the real address array comprises static random access memory (SRAM).

6. The method of claim 5, wherein the TLB comprises dynamic random access memory (DRAM).

7. The method of claim 1, wherein the real address array is configured to store a subset of address translations contained in the TLB.

8. The method of claim 7, wherein the subset of address translations comprise complete real addresses.

9. A system comprising:
   at least one processor core;
   at least one L2 cache;
   a real address array;
   a Translation Look-aside Buffer (TLB); and
   access circuitry configured to receive an effective address from the at least one processor core, retrieve trial real address bits from the real address array to initiate access to the L2 cache, retrieve a real address associated with the effective address from the TLB, compare the trial real address bits to bits in the real address retrieved from the TLB, if the trial real address bits and real address bits retrieved from the TLB match, complete the access using the trial real address, and if the trial real address bits and real address bits retrieved from the TLB do not match, complete the access using the real address retrieved from the TLB.

10. The system of claim 9, wherein the real address array comprises a Static Random Access Memory (SRAM).

11. The system of claim 10, wherein the TLB comprises Dynamic Random Access Memory (DRAM).

12. The system of claim 9, wherein the access circuitry is further configured to:
   update the real address array with the real address retrieved from the TLB if the trial real address and real address retrieved from the TLB do not match.

13. The system of claim 9, wherein the access circuitry is further configured to:
   discarding results obtained using the trial real address if the trial real address and real address retrieved from the TLB do not match.

14. The system of claim 9, wherein the trial real address comprises a complete real address.

15. The system of claim 9, wherein the real address array is configured to store a subset of address translations contained in the TLB.

16. A processor comprising:
   at least one L2 cache;
   a real address array;
   a Translation Look-aside Buffer (TLB); and
   access circuitry configured to receive an effective address, retrieve trial real address bits from the real address array to initiate access to the L2 cache, retrieve a real address associated with the effective address from the TLB, compare the trial real address bits to bits in the real address retrieved from the TLB, if the trial real address bits and real address bits retrieved from the TLB match, complete the access using the trial real address, and if the trial real address bits and real address bits retrieved from the TLB do not match, complete the access using the real address retrieved from the TLB.

17. The processor of claim 16, wherein the real address array comprises a Static Random Access Memory (SRAM).

18. The processor of claim 17, wherein the TLB comprises Dynamic Random Access Memory (DRAM).

19. The processor of claim 16, wherein the access circuitry is further configured to:
   update the real address array with the real address retrieved from the TLB if the trial real address and real address retrieved from the TLB do not match.

20. The processor of claim 16, wherein the access circuitry is further configured to:
   discarding results obtained using the trial real address if the trial real address and real address retrieved from the TLB do not match.

* * * * *